United States Patent [19]
Matsumoto

[11] Patent Number: 5,513,114
[45] Date of Patent: Apr. 30, 1996

[54] APPARATUS FOR AND METHOD OF COMPENSATING FOR POSITIONING ERROR

[75] Inventor: Kouki Matsumoto, Aichi, Japan

[73] Assignee: Mitsubishi Denki Kabushiki Kaisha, Tokyo, Japan

[21] Appl. No.: 107,374

[22] Filed: Aug. 17, 1993

[30] Foreign Application Priority Data

Aug. 19, 1992 [JP] Japan .................... 4-220161

[51] Int. Cl.⁶ .................... G06F 17/00
[52] U.S. Cl. .................... 364/474.35; 364/474.34; 318/630; 318/626
[58] Field of Search .................... 364/474.35, 474.34, 364/474.28, 474.12, 474.11; 318/560, 561, 568.22, 611, 626, 630

[56] References Cited

U.S. PATENT DOCUMENTS

| | | | |
|---|---|---|---|
| 4,792,738 | 12/1988 | Yamazaki et al. | 318/630 |
| 4,885,449 | 12/1989 | Suzuki et al. | 219/69.11 |
| 5,022,294 | 6/1991 | Higuchi et al. | 82/18 |
| 5,059,881 | 10/1991 | Fujita et al. | 318/630 |
| 5,210,478 | 5/1993 | Sasaki et al. | 318/632 |
| 5,237,509 | 8/1993 | Ueta et al. | 364/474.35 |
| 5,305,227 | 4/1994 | Sasaki et al. | 364/474.35 |
| 5,309,367 | 5/1994 | Sasaki et al. | 364/474.35 |
| 5,313,403 | 5/1994 | Fujita et al. | 364/474.26 |

*Primary Examiner*—Roy N. Envall, Jr.
*Assistant Examiner*—Brian C. Oakes
*Attorney, Agent, or Firm*—Sughrue, Mion, Zinn, Macpeak & Seas

[57] ABSTRACT

The present invention provides a numerical control system employing an automatic tuning section for automatically tuning control parameters, such as position deformation parameters, corresponding to the numerical control of the position of a table using a servo loop. In particular, the present invention provides an apparatus for, a method of, compensating for machine deformation and ballscrew errors produced by the play resulting from loose connections between a ballscrew and a moving table engaged thereto. The present invention provides a first and second change slowing means for respectively changing the compensation amounts of the machine deformation and ballscrew deformation error amount stored in a numerical control apparatus. The first and second change slowing means allow the machine deformation and ballscrew deformation error amounts, respectively, to be combined with a position command signal output from the numerical control apparatus to form a compensated control signal in order to control the positioning of the table with high accuracy.

13 Claims, 11 Drawing Sheets

DIRECTION REVERSAL FROM POSITIVE TO NEGATIVE DIRECTION

APPARATUS FOR AND METHOD OF COMPENSATING FOR POSITIONING ERROR

BACKGROUND OF THE INVENTION

1. Field of the Invention

The present invention is directed to the field of numerical control. More specifically, the invention is directed to an apparatus for and a method of carrying out positioning of a machine or the like under numerical control using a servo loop, and compensating for a positioning error thereof.

2. Description of the Background Art

The numerical control system shown in FIG. 5 has an automatic tuning function which automatically adjusts or sets control parameters, such as a servo loop gain, in a servo control loop used to control the position of a table. This control apparatus is described in more detail in U.S. Pat. No. 5,285,378, which is herein incorporated by reference. As shown in FIG. 5, a numerical control apparatus 1 outputs a position command signal to a servo amplifier 2 to control the operation of motor 3, thereby controlling the position of table 6. The magnitude of the drive current flowing through the motor 3 is detected by motor current detector 4 as the motor 3 is driven by servo amplifier 2. A ballscrew 5 is caused to rotate by the rotation of the motor 3. Table 6, which is fitted with the ballscrew 5, moves as the ballscrew 5 rotates. A table position detecting means 7, such as a table position detector, detects the position of the table 6 as it moves along ballscrew 5. A motor rotation position detecting means 9, such as a motor detector, detects the position of the table 6 on the basis of the output signal of an encoder mounted on the rotary shaft of the motor 3.

As described in the aforementioned co-pending application, the numerical control apparatus 1 is equipped with an automatic tuning section 8 that allows the numerical control apparatus 1 to select one or more of a plurality of control parameters, such as a compensation position command signal, to sample the selected control parameter at predetermined times, and to store the result into a control parameter memory 1b of the numerical control apparatus 1. Specifically, data sampling controller 1a provided in the numerical control apparatus proper selects any of the control parameters indicating the level of a velocity command signal and a current command signal (internal signals of the servo amplifier 2), a position signal output by the table position detector 7, a position signal output by the motor end detector 9, a velocity signal output by the velocity detecting means 91, a current signal output by the motor current detector 4, and other signals under the command of the tuning section 8, samples the selected parameter at a predetermined timing, and stores the result into a control parameter memory 1b of the numerical control apparatus. The control parameters output by the automatic tuning section 8 are similarly stored into the control parameter memory 1b.

The automatic tuning section is coupled to the numerical control apparatus 1 via signal line 10a and interface unit 10. The automatic tuning section 8 includes an internal data storage section 12 for storing status information of the numerical control apparatus 1, and the contents of the control parameter memory 1b. An optimum parameter value calculating section 13 is provided for determining whether the control parameters have reached optimum values based on the information stored in the internal data storage section 12, and for calculating an optimum value if such parameters are not at their optimum levels. A parameter change control section 14 is provided for setting the value of the control parameter calculated by the optimum parameter value calculating section 13, and transmitting the parameter value thus calculated to the control parameter memory 1b via interface 10 and signal line 10a. A test run control section 15 is provided for selecting an appropriate test run operation mode depending on the control parameter to be adjusted or set, and controlling a test run operation. When used herein, the term "test run" refers to the loop controlled movement of table 6 prior to an actual machining operation on a workpiece secured to the table. Such test runs are used to determine whether or not the control parameters are appropriate, and to set the control parameters accordingly. A general control section 11 is used to control the general operation of the components making up the automatic tuning section 8.

FIG. 6 illustrates the servo amplifier 2 in more detail. In general, the servo amplifier 2 functions to control the current flowing through the motor 3 based on the position command signal output from the numerical control apparatus 1, thereby controlling the position of the table 6. The amplifier 2 also functions to compensate for backlash in the mechanical positioning system (i.e., motor 3, ballscrew 5, and table 6). In response to the position command signal output from the numerical control apparatus 1, a travel direction/reversal timing outputting means 35 outputs a signal indicative of the travel direction of the table 6, and the reversal of such travel direction. The travel direction/reversal timing outputting means comprises a travel direction signal generating means for outputting a signal indicating the travel direction of the table 6 under the control of the position command signal, and a travel direction/reversal timing signal generating means for generating a travel direction reversing timing signal which indicates the timing of reversal the travel direction. A backlash compensation memory 36 stores a value equivalent to a backlash compensation amount stored in the control parameter memory 1b of the numerical control apparatus 1. The backlash compensation amount is used to compensate for the inherent play in the connection between the ballscrew 5 and table 6. A switch circuit 37a is moved to an "ON" position upon receiving a reversal output signal generated by outputting means 35 indicative of the reversal of the table 6 travel direction.

The movement of the switch circuit 37a, which is coupled to the backlash compensation memory 36, allows the backlash compensation amount stored in the memory 36 to be added to the position command signal by adding means 31a. Adding means 31a outputs a compensated position command signal, which is a signal resulting from the addition of the position command signal and the backlash compensation amount output from memory 36. When the switch circuit 37a is moved to the "OFF" position, the position command signal output from the adding means 31a is identical to the position command signal output from the numerical control apparatus 1. A subtracting means 31b subtracts the position signal output by the motor end detector 9, or the position signal output by the table position detector 7, from the compensated position command signal output from adding means 31a. Select switch 38 determines whether the motor end detector 9 or the table position detector 7 output is to be subtracted from the compensated position command signal.

A position control section 31 generates a velocity command signal in response to the signal output from subtracting means 31b. The subtraction output signal represents a position error value which is used in generating the velocity command signal. A velocity signal generating means 91 generates a velocity signal under control of the position signal output by the motor end detector 9. A subtracting means 32a subtracts the velocity signal from the velocity command signal output by the position control section 31. A velocity control section 32 generates a current command signal in response to the velocity error value which is the subtraction output from the subtracting means 32a. A further subtracting means 33a subtracts a current signal output from motor current detector 4, from the current command signal generated by velocity control section 32. A current control section 33 outputs a signal in response to a current error value which is the subtraction signal output from subtracting means 33a. Pulse width modulator (PWM) circuit 34 modulates the output of a DC power supply having a predetermined voltage so that an average power is supplied to the motor 3 in response to the output signal of the current control section 33. The subtracting means 31b, the position control section 31, the subtracting means 32a, the velocity control section 32, the subtracting means 33a, the current control section 33 and the PWM circuit 34 constitute motor driving means.

FIG. 7(a) illustrates the relationship between the compensation position command signal and the actual machine end position as a function of the position command signal. In particular, the solid line represents the compensation position command signal, while the dashed line represents the actual machine end position. FIG. 7(b) illustrates the same relationship where backlash compensation has been performed in the manner described above. In comparing FIGS. 7(a) and 7(b), FIG. 7(b) illustrates the successful use of compensation position command signals for compensating for the backlash of the actual position, and matching the position command signal with the actual position.

FIG. 8 illustrates how the motor 3 rotates the ballscrew 5 to cause the table 6 to move. In particular, a drive force $F_0$ is applied by the ballscrew 5 to the table 6 at the point $X_0$ where the table 6 engages the ballscrew 5 (hereinafter referred to as the "table displacement"). The sliding resistance force $F_1$ is applied to the table 6 by a sliding surface 16. If the acceleration of the table 6 is zero, the drive force $F_0$ is equal to the sliding resistance force $F_1$. Reference numeral $X_1$ indicates the detection output of the table position detector 7 (hereinafter referred to as the "position detector end displacement"). Reference numeral $X_2$ indicates the position of the workpiece 17 secured and supported by the table 6 (hereinafter referred to as the "machine end displacement").

FIGS. 9(a) and 9(b) illustrate how the position of the table 6 pitches and deforms depending on the travel direction of the table 6. In particular, FIG. 9(a) illustrates the positional deformation in a positive direction of travel, while FIG. 9(b) illustrates a similar deformation in a negative direction of travel. According to these figures, the position detector end displacement $X_1$ and the machine end displacement $X_2$ can be represented by the following equations:

For (FIG. 9(a)):

$$X_1 = X_0 + L_1\theta_a \quad \text{(Equation 1)}$$

$$X_2 = X_0 - L_2\theta_a \quad \text{(Equation 2)}$$

For (FIG. 9(b)):

$$X_1 = X_0 - L_1\theta_b \quad \text{(Equation 3)}$$

$$X_2 = X_0 + L_2\theta_b \quad \text{(Equation 4)}$$

where $L_1$ represents the distance from the fitting area of the ballscrew 5 and the table 6 to the table position detector 7, $L_2$ represents the distance from the fitting area to the workpiece 17, $\theta_a$ represents the positional deformation angle of the table 6, when the table travels in the positive direction, and $\theta_b$ represents the positional deformation angle of the table 6 when the table travels in the negative direction.

FIG. 10 illustrates the relationship between position detector end displacement $X_1$ and the machine end displacement $X_2$ as a function of the table displacement $X_0$. In particular, the solid line represents the position detector end displacement $X_1$, and the long/short-dashed line represents the machine end displacement $X_2$. As shown in the figure, the position detector end displacement $X_1$ includes a backlash component $L_1$ ($\theta_a\theta_b$), while the machine end displacement $X_2$ includes a backlash component $L_2$ ($\theta_a\theta_b$), with respect to table displacement $X_0$.

FIG. 11 illustrates the relationship between the position detector end displacement $X_1$ (solid line) and the machine end displacement $X_2$ (long/short-dashed line) as a function of the position command signal at a time when switch 38 is set to the table position detector 7 position to form a full-closed loop control. Because the full-closed loop control causes the position detector end displacement $X_1$ and the position command signal to match, a deformation error similar to backlash, although attributable to machine rigidity, occurs between the position command signal and the machine end displacement $X_2$. An error value $\Delta X_2$ (hereinafter referred to as the "machine deformation error"), which is related to machine rigidity, can therefore be represented by the following equation:

$$\Delta X_2 = (L_1 + L_2)(\theta_a + \theta_b) \quad \text{(Equation 5)}$$

The error value $\Delta X_2$ can also be represented by the following equation:

$$\Delta X_2 = 2 F_0/k_2 \quad \text{(Equation 6)}$$

where $k_2$ represents the machine end rigidity. This representation can be made because the positional deformation amount angles $\theta_a$ and $\theta_b$ are proportional to the moment applied to the table 6. From the above equations, it can be seen that the drive force $F_0$ changes when the travel direction is reversed, as shown in FIG. 12. The table position detector 7 is disposed away from where the workpiece is located, there are many cases where (L1+L2) cannot be reduced, and there are many cases where angle $\theta_a + \theta_b$ generated by the pitching of the table 6 is not small due to the accuracy, etc., of the mechanism section.

As shown in FIG. 13, the relationship between the position command signal and the machine end position $X_2$ differs in error magnitude immediately after reversal of the travel direction between the required backlash compensation (continuous solid line) and the required machine deformation error compensation (long/short-dashed line); the difference in error magnitude is shown in the figure as a hatched area.

FIG. 14 illustrates the relationship between the position command signal and the machine end position $X_2$ when a backlash compensation technique is used to compensate for the actual machine deformation error. As can be seen, the difference between the backlash compensation and the machine deformation error compensation (shown as hatched areas in FIG. 14) results in overcompensation, thereby causing a large error between the position command signal and the machine end position $X_2$ immediately after the reversal of the travel direction.

Where $X_3$ is the motor end detector displacement, which is output from motor end position detector 9, and the table 6 travels in a positive direction, there is the following relationship:

$$X_1-X_3=-F_0/k_1 \quad \text{(Equation 7)}$$

When the table 6 travels in the negative direction, the following relationship exists:

$$X_1-X_3=F_0/k_1 \quad \text{(Equation 8)}$$

where $k_1$ indicates ballscrew rigidity. Hence, the deformation amount $\Delta X_1$ of the ballscrew 5 at the time the table 6 reverses travel direction can be represented as follows:

$$\Delta X_1 32\ 2\ F_0/k_1 \quad \text{(Equation 9)}$$

FIG. 15(a) illustrates a change in deformation amount of the ballscrew at the reversal of the table 6 travel direction, and FIG. 15(b) shows how the velocity command signal and the velocity signal, which is the detection output of the velocity detecting means 91, change with time at the reversal of the table 6 travel direction. At the reversal of the table 6 travel direction, the difference between the velocity command signal and the velocity signal (or the detection output of the Velocity detecting means 91) deviates from a stable or constant value relative to the velocity command signal. As a result, a response delay occurs during the change of the ballscrew 5 deformation amount (shown in FIG. 15(a)).

Although the stationary value $\Delta X_1$ of the ballscrew 5 deformation amount does not affect the error of machine end displacement $X_2$ during full-closed loop operation, the response delay results in a positioning error at the time of quadrant switching, thereby reducing the machining accuracy of the workpiece 17.

One prior art attempt to solve the above response delay problem is set forth in Japanese Patent Publication No. 148315/1988. This publication, however, does not take into account the machine deformation error problem discussed above, or the problems associated with the automatic tuning compensation apparatus also discussed above.

A method of checking the sufficiency of compensation regarding machine deformation error and response delay is shown in FIGS. 16 and 17. In FIG. 16, object 171, having a circumferential surface machined with high accuracy, is fixed to table 6 via surface plate 6a. A displacement meter 18 is employed to measure the position of the circumference of the object 171. By causing the displacement meter 18 to revolve around the Z-axis, while simultaneously controlling the X- and Y-axis of the table 6 (without rotating the table), the displacement meter 18 can travel around the circumference of the object 171 and measure its displacement. Displacement meter output data processor 19 converts measurement information output from the meter 18 into information which can be processed by numerical control apparatus 1. The data processor 19 may also use the information to determine the positioning error and output the error to a plotter or the like.

The apparatus shown in FIG. 16 is similar to that shown in FIG. 5 with the exception of the surface plate 6a, object 171, displacement meter 18, and data processor 19. It follows from the above discussion that as the positioning accuracy of the table 6 increases, the change in output of the displacement meter 18 decreases. However, if it has been determined from the positioning error data output by the plotter that the position accuracy of the table 6 is not satisfactory, the appropriate control parameter values must be reset on a trial and error basis by the operator.

The prior art thus described does not require further backlash compensation, but cannot compensate for the machine deformation error under full-closed loop control, which operates to match the position command signal and the detection output of the table position detector 7. Moreover, when the prior art apparatus does compensate for machine deformation error, it does so by employing a given or set compensation amount, which does not change with time. As the machine deformation error changes in magnitude with time at the reversal of the travel direction of table 6, the matching of the position command signal with the motor end detector 9 in the semi-closed loop mode results in overcompensation. In addition, the prior art apparatus does not include means for detecting or calculating the compensation amount for the position accuracy error of table 6.

SUMMARY OF THE INVENTION

In order to overcome the above and other problems in the prior art, an apparatus for and method of compensating for a machine deformation error in a full-closed loop numerical control apparatus is provided.

It is another object of the invention to provide an apparatus for and method of compensating for a machine deformation error with high accuracy in either a semi-closed loop or a full-closed loop numerical control apparatus.

It is a further object of the present invention to provide an apparatus for and method of detecting or calculating a compensation amount or a compensation parameter in a numerical control apparatus.

In order to achieve the above and other objects, the present invention provides a numerical control system employing an automatic tuning section for automatically tuning control parameters, such as position deformation parameters, corresponding to the numerical control of the position of a table using a servo loop. In particular, the present invention provides an apparatus for and a method of compensating for machine deformation and ballscrew deformation errors that result after a table travel direction is reversed. The present invention provides a first and second change slowing means for respectively changing the compensation amounts of the machine deformation and ballscrew deformation error stored in a numerical control apparatus. The first and second change slowing means allow the machine deformation and ballscrew deformation error amounts, respectively, to be varied with time and combined with a position command signal output from the numerical control apparatus to form a compensated control signal in order to control the positioning of the table with high accuracy.

DETAILED DESCRIPTION OF THE PREFERRED EMBODIMENTS

Figure 1:
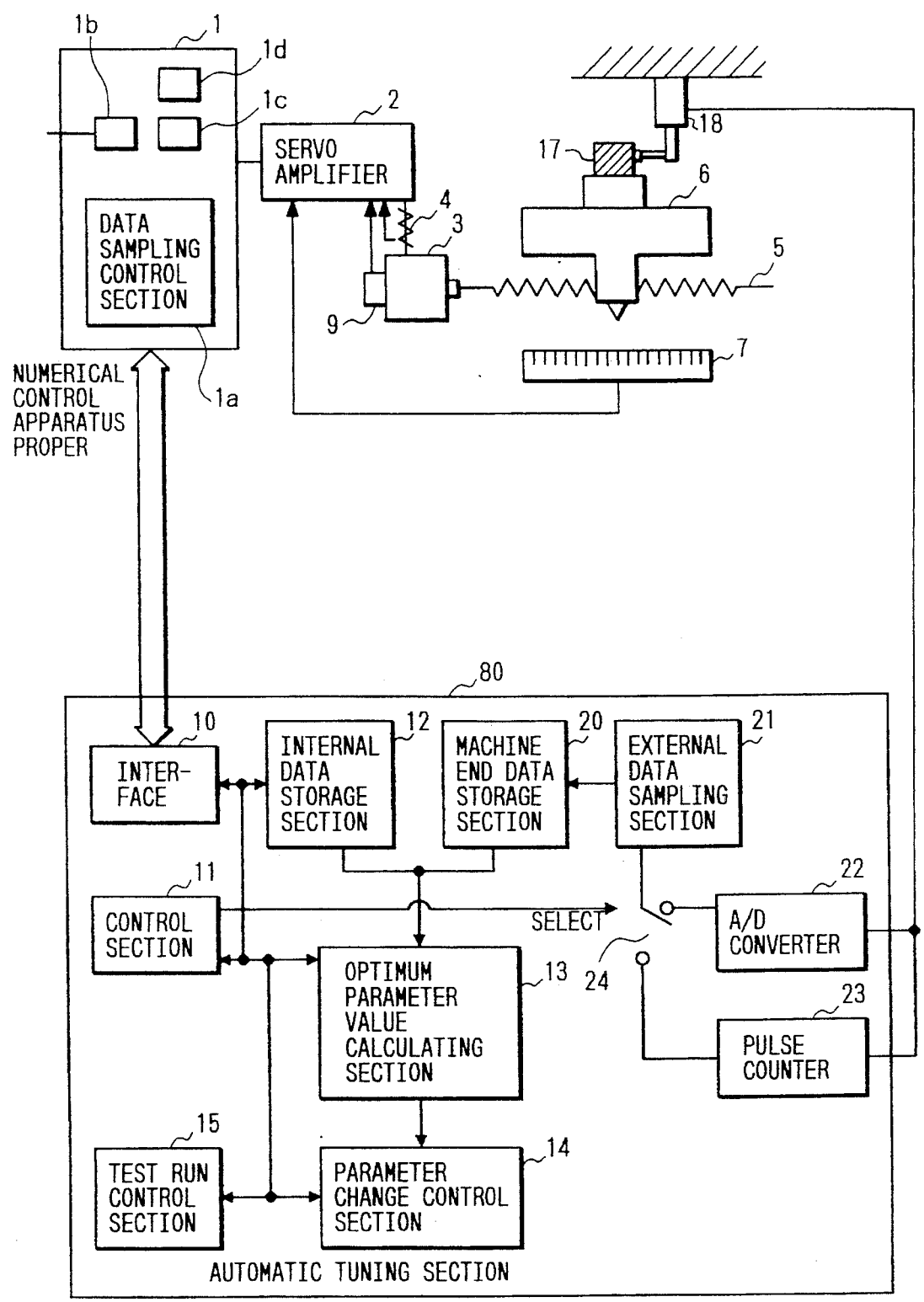
FIG. 1 is a block diagram of a numerical control system having an automatic tuning function according to a preferred embodiment of the present invention.
Figure 5:
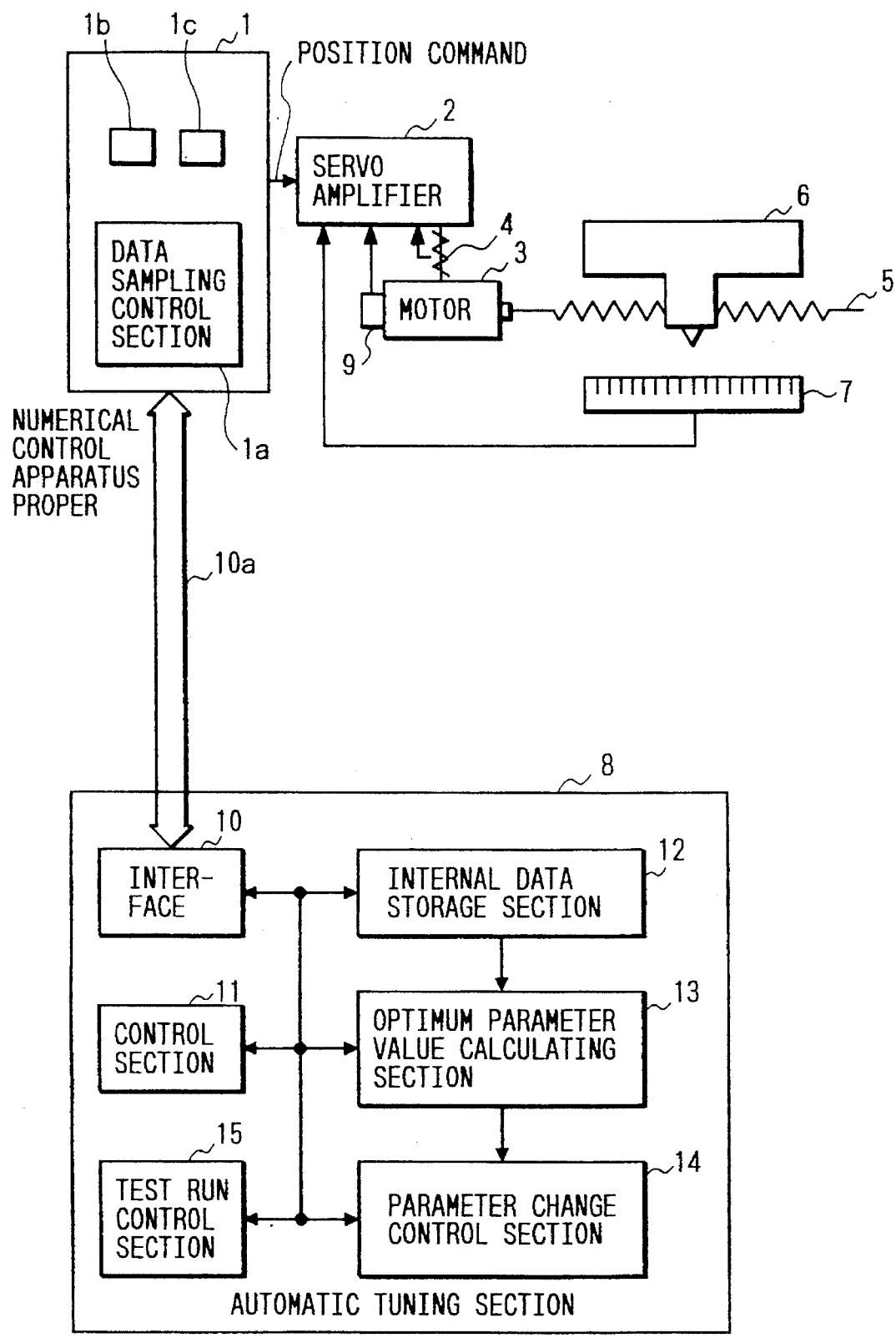
FIG. 5 is a block diagram of a known numerical control system having an automatic tuning function.

FIG. 1 illustrates a numerical control apparatus constructed according to one embodiment of the present invention. FIG. 1 is similar to the numerical control apparatus shown in FIG. 5 discussed above. All like elements are depicted with identical reference numerals and are therefore not described in detail herein.

In FIG. 1, the automatic tuning section 80 automatically measures control parameters, such as a machine deformation error, calculates predetermined control data, and stores such parameters and data in a predetermined memory. In an alternate embodiment, the automatic tuning section 80 may be contained within the numerical control apparatus 1. However, for the present purposes, automatic tuning section 80 is separated from numerical control apparatus 1, but remains in communication therewith via interface 10. Automatic tuning section 80 is also connected to machine end detecting means 18, e.g., a displacement meter, for receiving analog or pulse train data concerning the displacement of workpiece 17 via analog-to-digital (A/D) converter 22, or pulse counter 23. (It should be noted, however, that in the alternative, the A/D converter 22 and the pulse counter 23 may be embodied in the servo amplifier 2 or in the numerical control apparatus 1 to produce an identical effect.) An external data sampling section 21 samples information output from A/D converter 22 or pulse counter 23, with a predetermined timing. Under control of section 11, a select switch 24 changes to select either the A/D converter 22 or the pulse counter 23 to allow connection to external data sampling section 21. A machine end data storage section 20 stores sampled data output from the external data sampling section 21. The machine end data storage section 20 enters such data, together with data from internal data storage section 12 into optimum parameter value calculating section 13.

Figure 2:
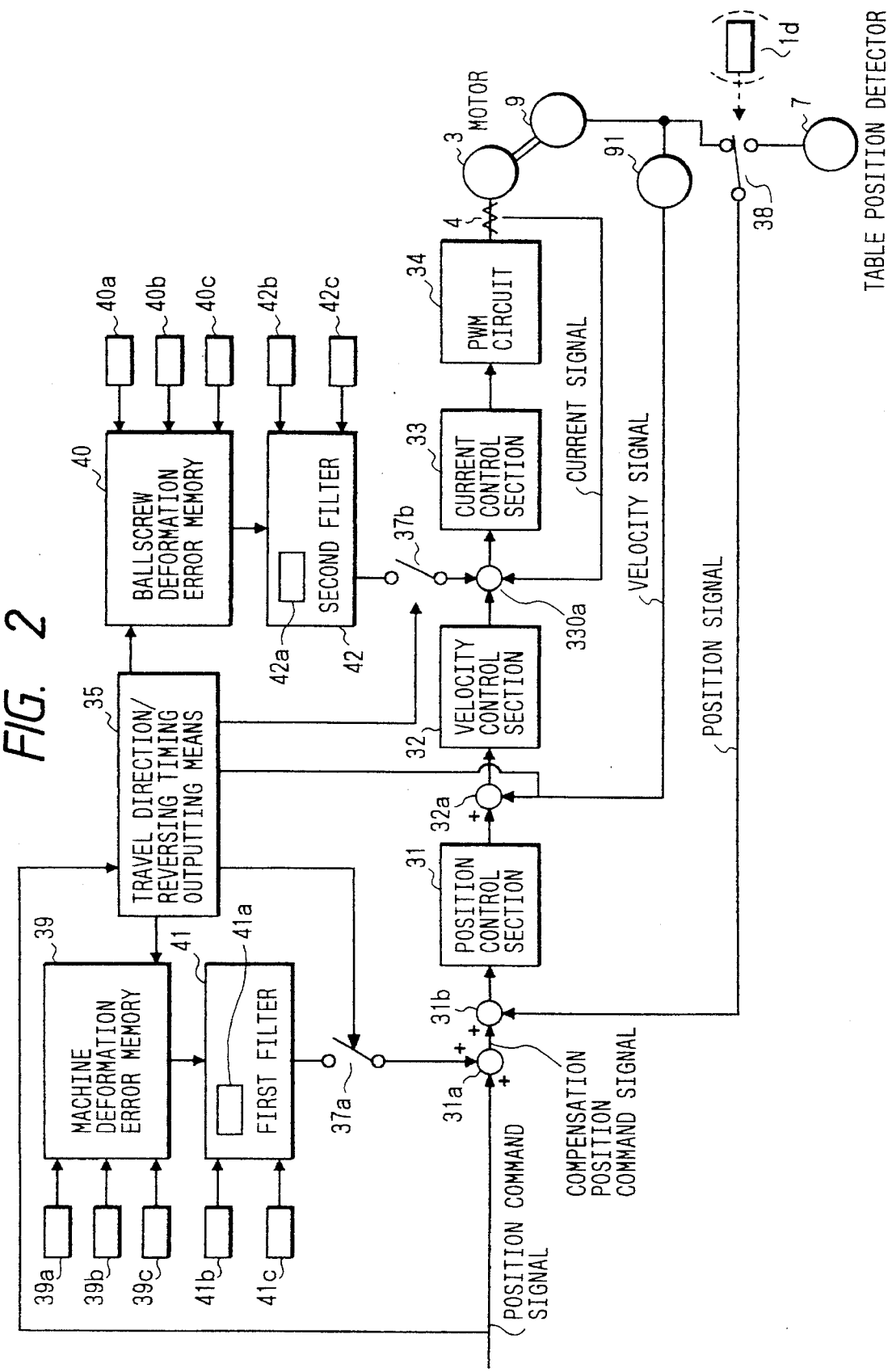
FIG. 2 is a function block diagram of a servo amplifier according to the preferred embodiment of the present invention.
Figure 6:
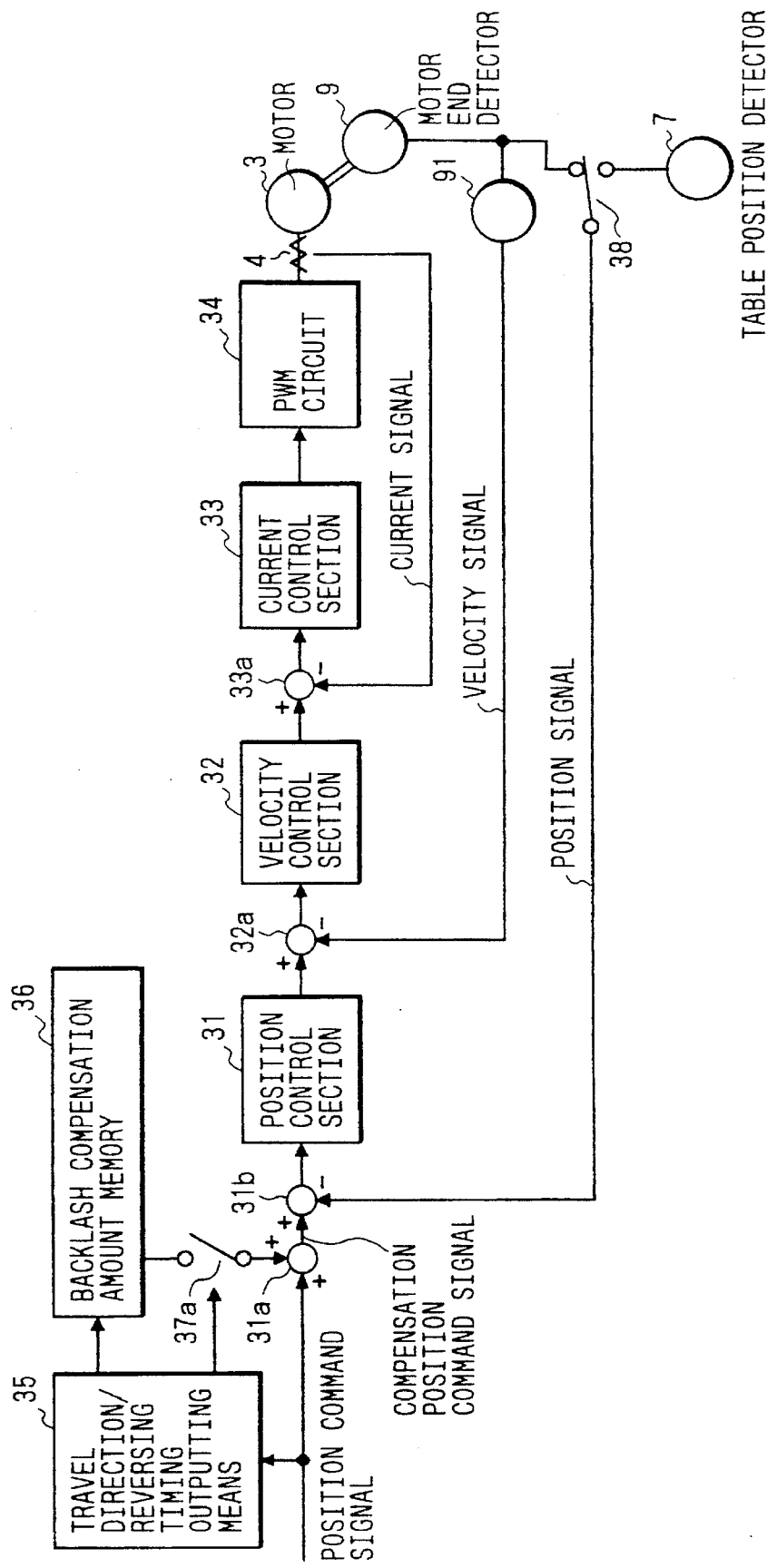
FIG. 6 is a block diagram of a servo amplifier in the known system shown in FIG. 5.
Figure 8:
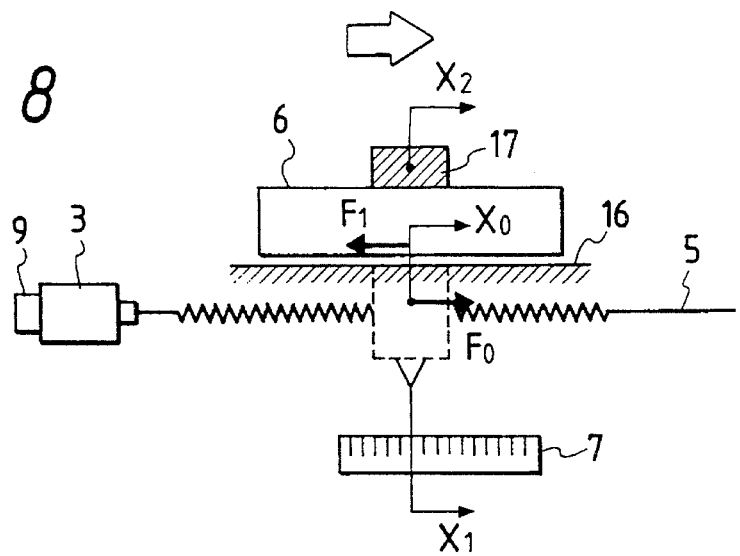
FIG. 8 illustrates the dynamic forces that allow a motor to control the position of a table.
Figure 9A:
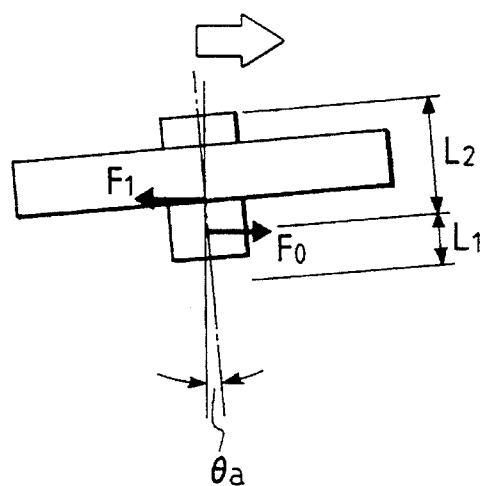
FIGS. 9(a) and 9(b) illustrate pitching of the table during forward and reverse travel directions, respectively.
Figure 9B:
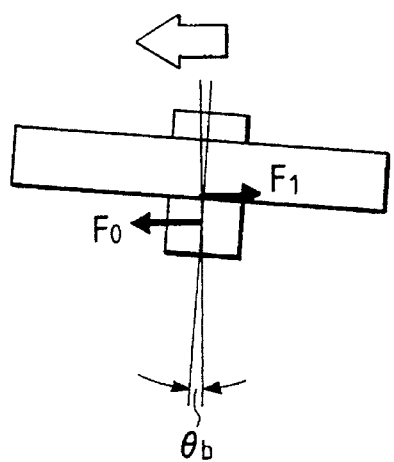
Figure 10:
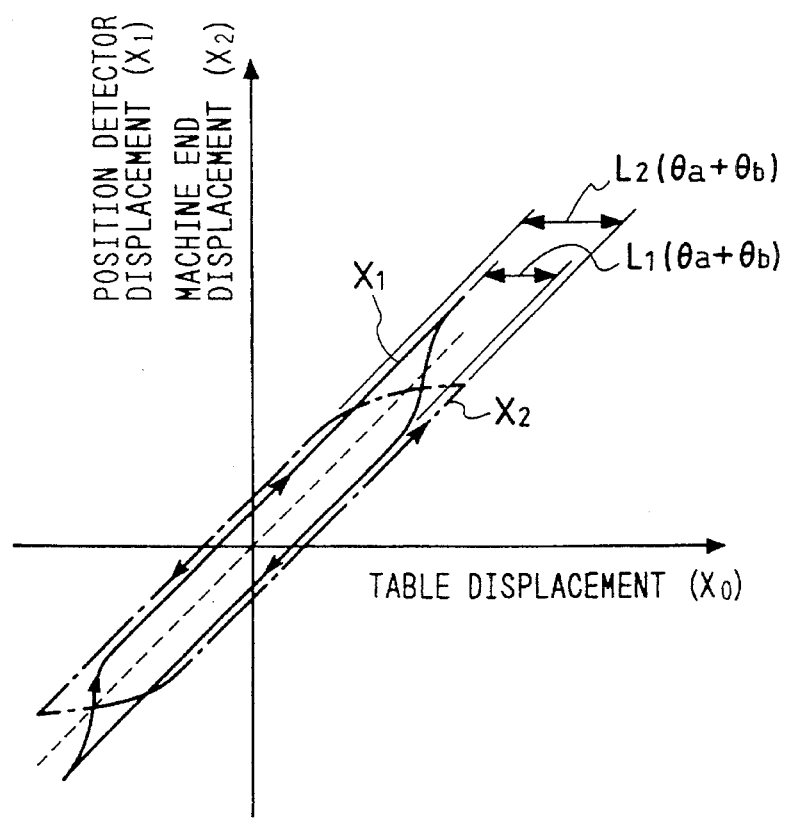
FIG. 10 illustrates the loci of table displacement, position detector displacement and machine end displacement.
Figure 11:
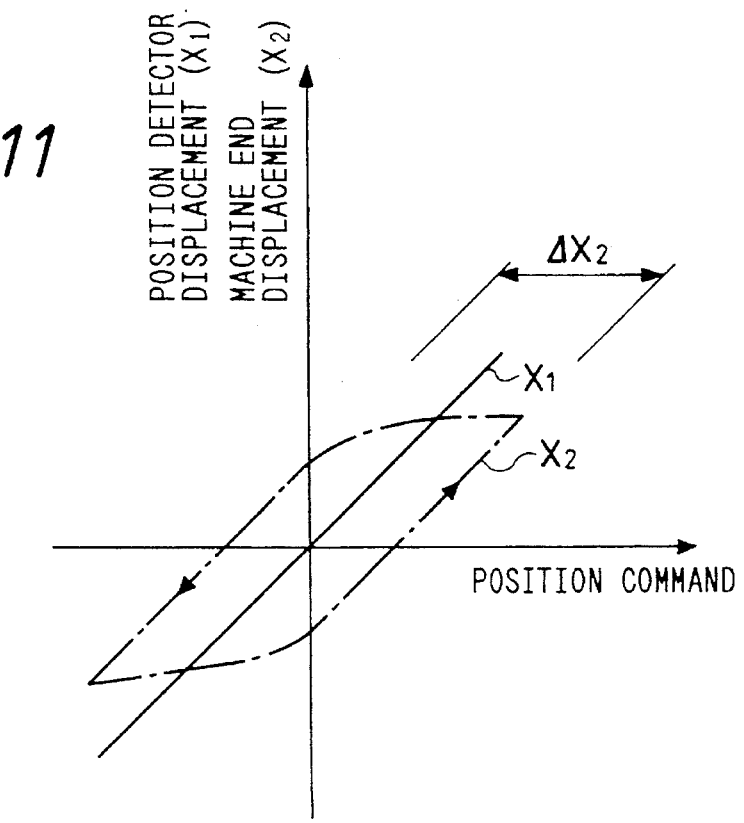
FIG. 11 illustrates the loci of position detector displacement and machine end displacement under full-closed loop control.

FIG. 2 illustrates a detailed block diagram of the servo amplifier 2 shown in FIG. 1. The servo amplifier shown in FIG. 2 is similar to that shown in FIG. 6, wherein all like elements are indicated by identical reference numerals and therefore will not be discussed in detail herein. In the servo amplifier of FIG. 2, a machine deformation error memory 39 stores a machine deformation error ($\Delta X_2$), which indicates the variation of a difference between the detection output of displacement meter 18 and the output of table position detector 7 at the reversal of the table 6 travel direction. A ballscrew deformation error memory 40 stores a ballscrew deformation error ($\Delta X_1$) in the form of a current value, which indicates the magnitude of a change in variation of the ballscrew 5 deformation at the reversal of the table 6 travel direction. When data is read from either the machine deformation error memory 39 or the ballscrew deformation error memory 40, a travel direction signal output by the travel direction/reversing timing outputting means 35 causes a positive or negative sign value to be assigned to the data thus read.

Also shown in FIG. 2, a first change slowing means 41, e.g., a first filter, receives the machine deformation error from the machine deformation error memory 39 and outputs the error signal after changing it slowly or gradually with time. Similarly, a second change slowing means 42, e.g., a second filter, receives ballscrew deformation error data from the memory 40, and outputs the error signal after changing it slowly with time. The first change slowing means 41 outputs the altered machine deformation error data to the first terminal of switch circuit 37a, which is normally kept in an "ON" position so as to connect the output signal of the first change slowing means 41 to a terminal of the adding means 31a. Adding means 31a adds the altered machine deformation error signal to the position command signal transmitted by numerical control apparatus 1 (FIG. 1). Similarly, the ballscrew deformation error signal output from second change slowing means 42 is connected to adding means 330a via switch circuit 37b. Switch circuit 37b is placed in the "ON" position upon the reversal of the travel direction of the table 6. Upon reversal, the ballscrew deformation signal error is added to the current command signal by the adding means 330a, which forms a current command compensating means 330a. In an alternative embodiment, the first and second change slowing means, 41 and 42, respectively, can be omitted. With such alternative construction, the problem of overcompensation may not be eliminated, however, other effects of the invention can be achieved.

The servo amplifier 2 is further composed of machine deformation error reading means 39a for reading the machine deformation error from the error memory 39. A machine deformation error calculating means 39b calculates or detects the machine deformation error. The machine deformation error ($\Delta X_2$) can be found by equation 5 (discussed above) by determining the variation of the difference between the detection output of the displacement meter 18 and the table position detector 7 at the time of a reversal of the table 6 travel direction. Once calculated, the machine deformation error writing means 39c writes the machine deformation error to the memory 39. Similarly, a ballscrew deformation error reading means 40a reads the ballscrew deformation error from the memory 40.

A ballscrew deformation error calculating means 40b calculates the ballscrew deformation error ($\Delta X_1$), as derived in accordance with equations 7 through 9 (discussed above), by calculating or determining the torque equivalent to the variation in the ballscrew deformation amount, which is the difference between the detection output of the motor end detector 9 and the table position detector 7 at reversal of the table 6 travel direction. For example, the ballscrew deformation error calculating means 40b may calculate or generate the torque equivalent thus described using the current value of the motor 3. A ballscrew deformation error writing means 40c writes the current value to the ballscrew deformation error memory 40. The ballscrew deformation error value is a current amount whose magnitude is based on the current of the motor 3.

The first change slowing means 41 alters or modifies the characteristics of the machine deformation error values stored in error memory 39 in accordance with data stored in a first parameter memory 41a. A first parameter calculating means 41b detects or calculates a first parameter for storage in the memory 41a on the basis of the machine deformation error when its magnitude is on its way to changing according to the detection output of the displacement meter 18, and that of the table position detector 7 at the reversal of the table 6 travel direction. The first parameter data may be, for example, a time constant of a first filter 41, wherein the time constant represents the length of time from when the position command for reversing the table 6 travel direction is output, until the magnitude of the machine deformation error changes by 63 percent of its magnitude. (In the alternative, the time constant may be a given length of time.) Upon detecting or calculating the first parameter, a first parameter writing means 41c writes the first parameter to the parameter memory 41a.

Similarly, second change slowing means 42 provides a second parameter calculating means 42b for calculating a second parameter on the basis of the ballscrew deformation error as its magnitude is on the way to changing on the basis of the detection output of the table position detector 7 and the motor end detection 9. From the equations 7 through 9 discussed above, the magnitude of the ballscrew deformation error can be found by detecting the difference between the output $X_3$ and the output $X_1$ of the table position detector 7. The second parameter calculating means 42b more specifically calculates the second parameter, which may be for example a time constant for second filter 42, by detecting the period of time from when the position command for reversing the table 6 travel direction is output, until the ballscrew deformation error changes by 63 percent of its magnitude. (In the alternative, the time constant may be a given length of time.) Once calculated, the second parameter is stored in the memory 42a by second parameter writing means 42c.

Figure 12:
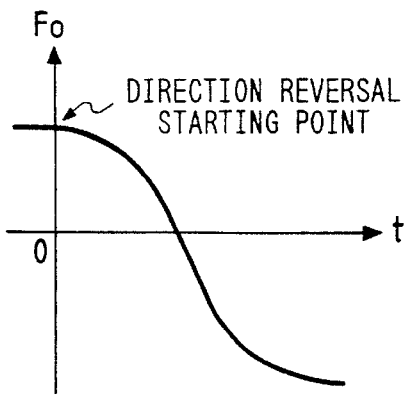
FIG. 12 illustrates a change of drive force $F_0$ as a function of time during a reversal of a travel direction of the table.
Figure 13:
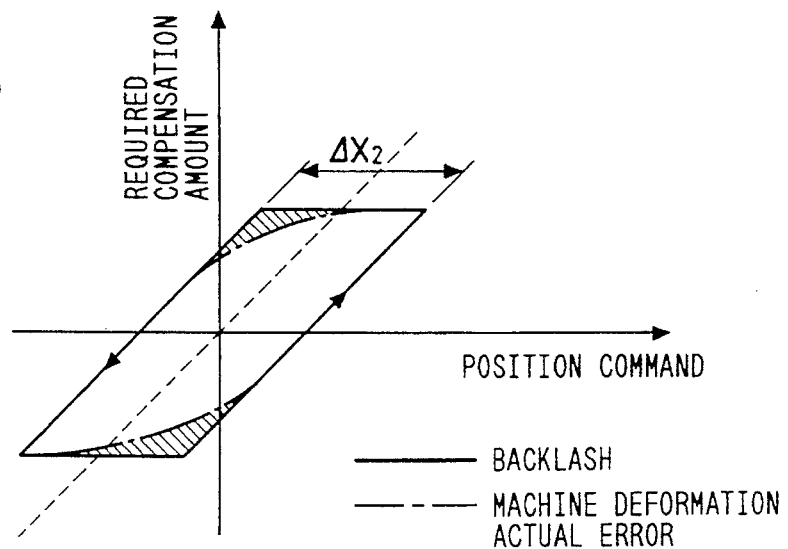
FIG. 13 illustrates a difference between a locus resulting from backlash compensation and a locus resulting from a machine deformation compensation.
Figure 14:
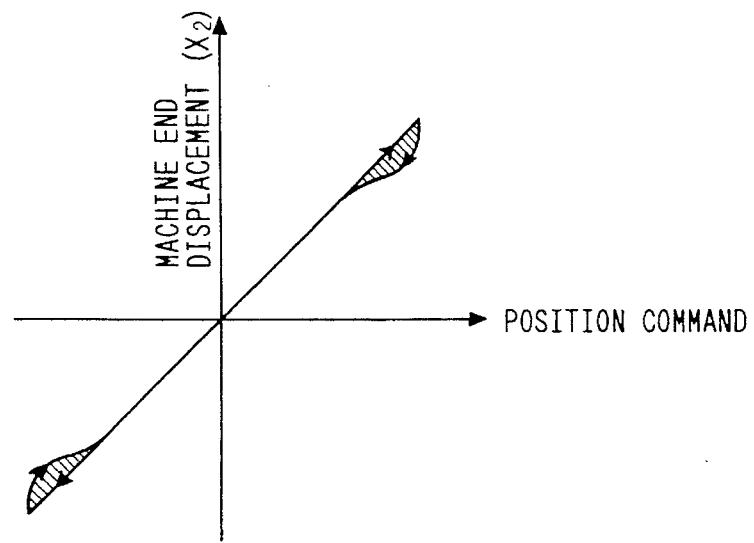
FIG. 14 illustrates a relationship between a position command and machine end displacement at a time when an error caused by machine deformation is compensated by using backlash compensation.
Figure 15A:
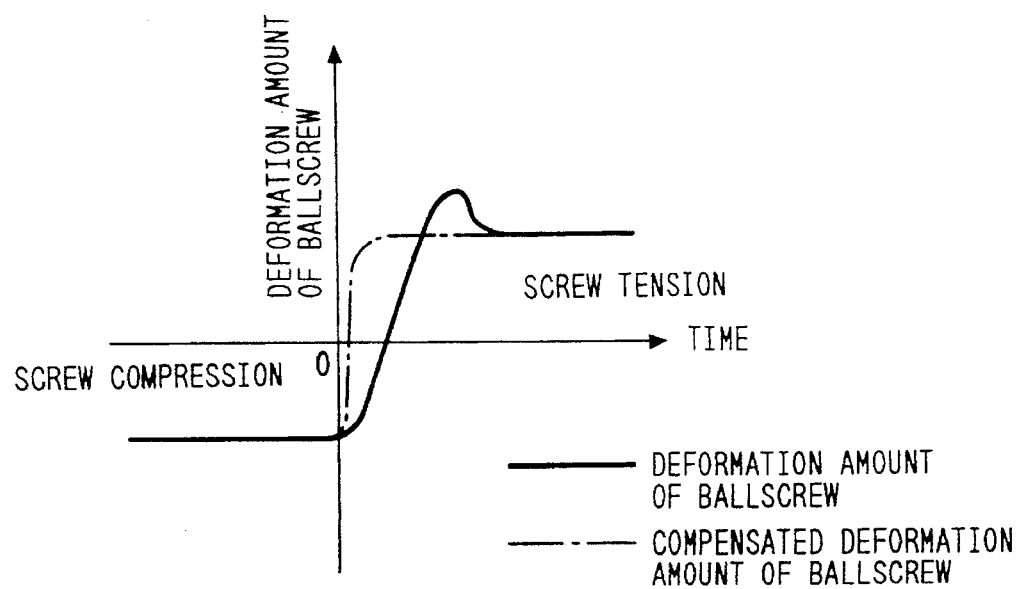
FIG. 15(a) illustrates a change in deformation amount of the ballscrew at the reversal of the table travel direction.
Figure 15B:
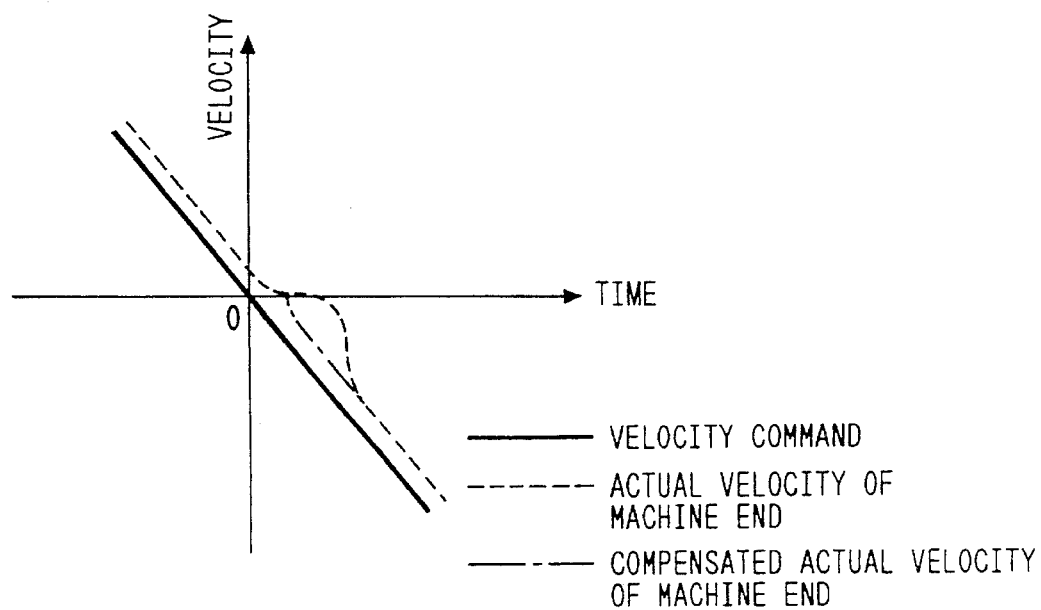
FIG. 15(b) shows how the velocity command signal and the velocity signal change with time at the reversal of the table travel direction.
Figure 16:
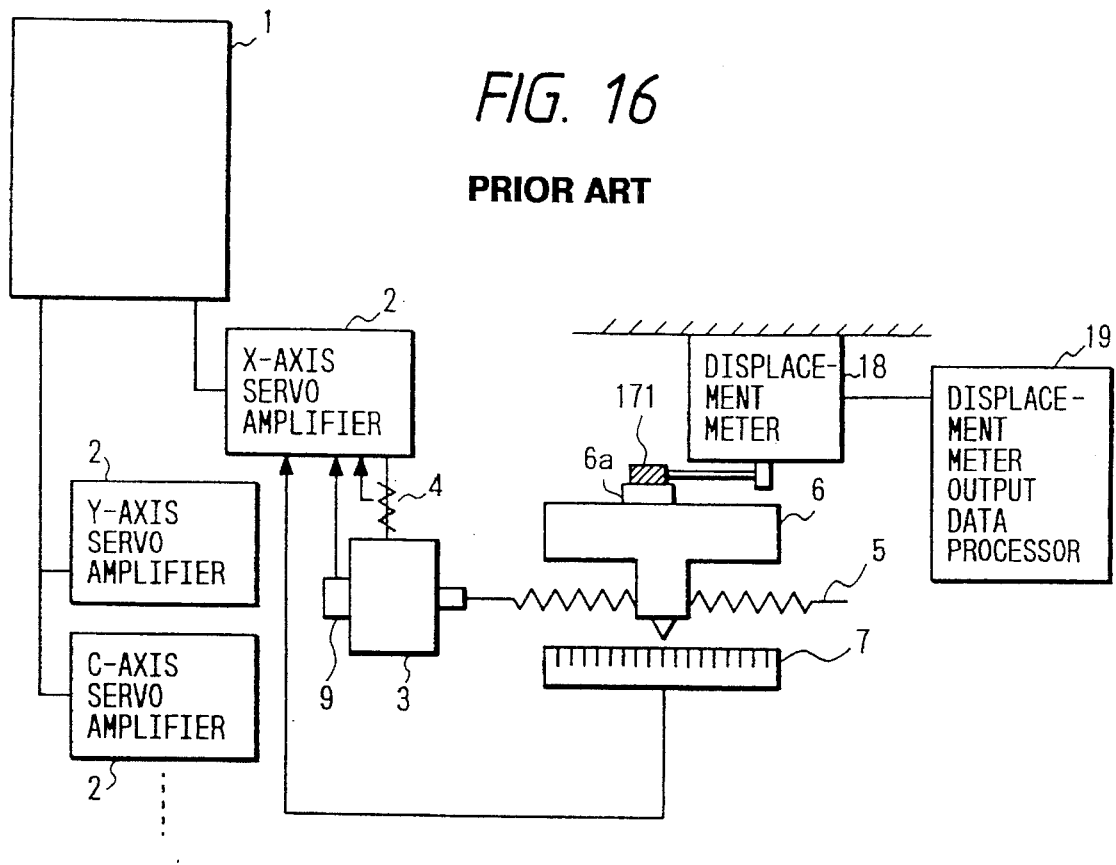
FIG. 16 illustrates a method of measuring table position accuracy using a displacement meter.
Figure 17:
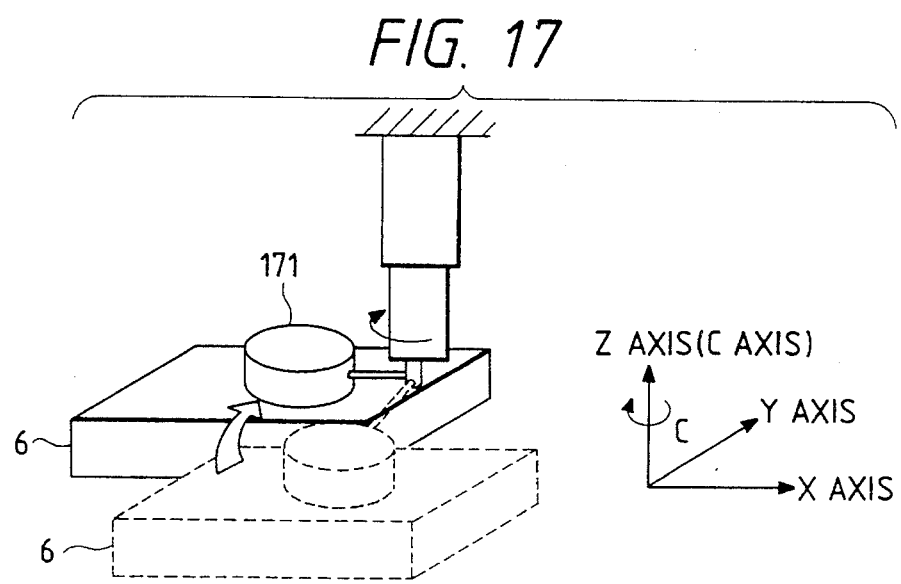
FIG. 17 illustrates how the table travels when the table position accuracy is measured with the displacement meter.

In accordance with the structure thus described, first change slowing means 41 prevents the overcompensation resulting from the backlash compensation in the prior art apparatus as shown in FIG. 12. The difference (hatched areas shown in FIG. 14) between the position command signal and the machine end displacement $X_2$ is compensated by the machine deformation error output by the first change slowing means 41 with time.

The second change slowing means 42 operates to change the output of the ballscrew deformation error values stored in memory 40 with time on the basis of the second parameter stored in memory 42a. The second parameter calculating means 42b monitors and sets the second parameter so that the time constant at a time when compensation torque is applied to the current command which is the most appropriate on the basis of the ballscrew 5 deformation amount when it is on the way to changing at the reversal of the table 6 travel direction.

Figure 3:
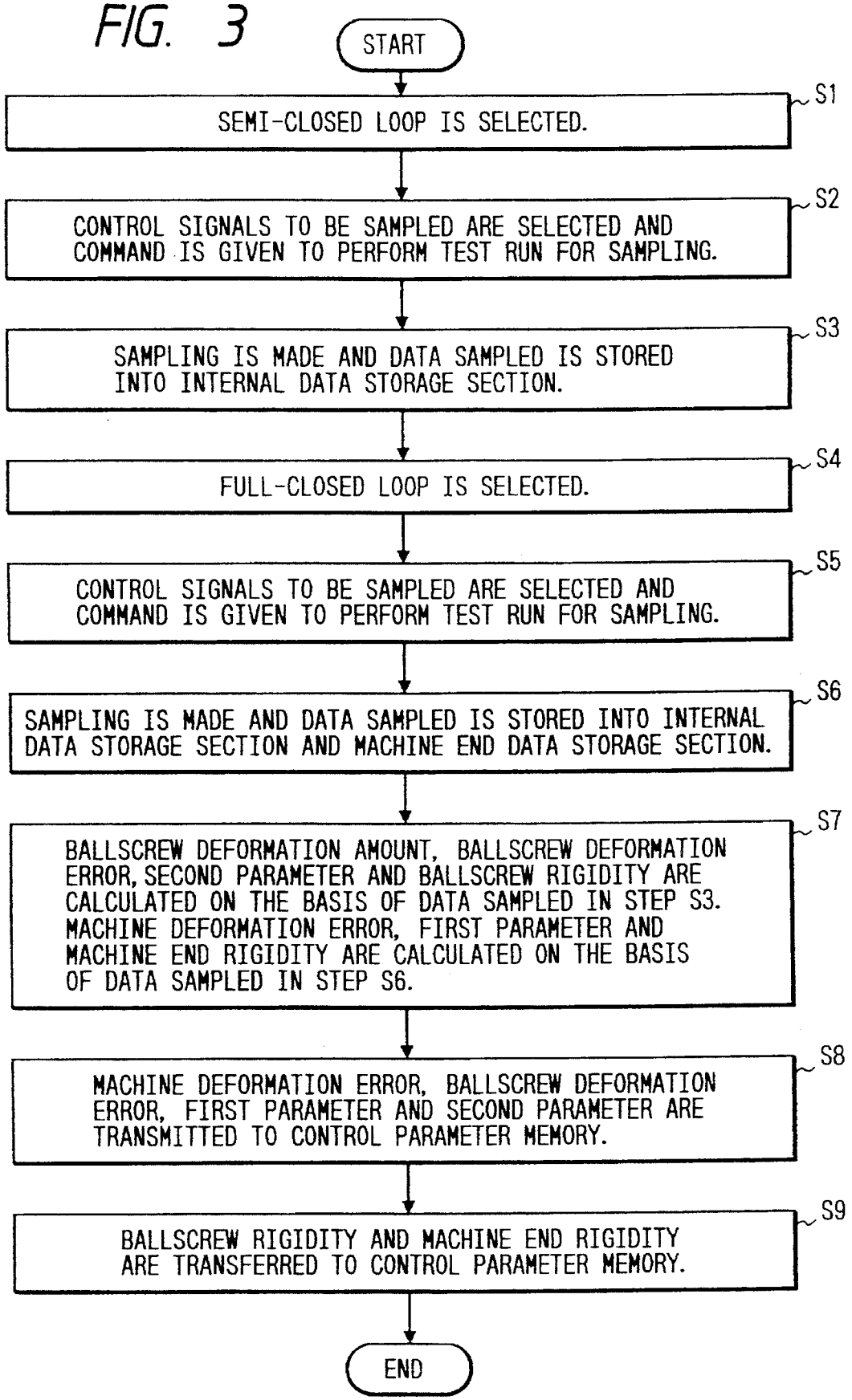
FIG. 3 is a flow chart illustrating the operation of an automatic tuning section according to the preferred embodiment of the present invention.

The operation of the numerical control apparatus shown in FIGS. 1 and 2 will now be summarized with reference to the flow chart illustrated in FIG. 3.

In step S1, the position of the select switch 38 (FIG. 2) is moved to select a semi-closed loop mode in response to the command signal output by the select command means 1d (FIG. 1). In the semi-closed loop mode, the position control is exercised in accordance with the detection output of the motor end detector 9 to detect the position of the table 6 via rotation of the motor 3. In this manner, the detection output of the motor end detector 9 matches the compensation position command signal. In step S2, control section 11 (FIG. 1) sets the data sampling control section 1a to sample the position signal which is the detection output of the motor end detector 9, and to further sample the velocity signal output from the velocity detecting means 91. Sampling control section 1a is further controlled to sample the position signal output from the table position detector 7, and the current signal output from the motor current detector 4. Control section 11 then commands control section 15 to perform the first test run, thereby causing the travel direction of the table 6 to reverse, and to sample the data. In step S3, the aforementioned sampling is carried out, and the resulting data is stored in the internal data storage section 12. In step S4, the first test run is terminated, and the position of the select switch 38 is changed to select a full-closed loop mode, wherein the position control of the table 6 is carried out such that the output of the table position detector 7 matches the compensation position command signal.

In step S5, the control section 11 sets the data sampling control section 1a to sample as internal data the position signal, which is the detection output of the table position detector 7. Sampling control section 1a is further controlled to sample the velocity signal which is the detection output of the velocity detecting means 91, and the current signal which is the detection output of the motor current detector 4. The control section 11 further sets the sampling control section 1a to sample the output of the displacement meter 18. Control section 11 then commands the control section 15 to perform the second test run, which reverses the travel direction of the table 6. In step S6, the aforementioned sampling is performed and the data thus resulting is stored in the internal data storage section 12 and the machine end data storage section 20.

In step S7, the ballscrew deformation error, in the form of a current value from motor 3, is calculated on the basis of the change in variation of the ballscrew 5 deformation amount, or a difference between the detection output $X_3$ of motor end detector 9 and the detection output $X_1$ of the table position detector 7, stored in step S3. The second parameter calculating means 42b determines the appropriate time constant of the second filter 42 on the basis of a period of time from when the position command for reversing the table 6 travel direction is output until when the change in ballscrew deformation amount reaches 63% in magnitude.

In addition, the signals output from current detector 4 are multiplied by a torque constant to produce the drive force $F_0$. Given the drive force $F_0$ and the ballscrew deformation error $\Delta X_1$, the ballscrew rigidity can be determined using, for example, equation 9 described above. The machine deformation error $\Delta X_2$ is calculated as the variation of the difference between the output $X_1$ of the table position detector 7 and the output $X_2$ of the machine end detector 18 before and after the reversal of the table 6 travel direction. The first parameter, such as a time constant for first filter 41, is determined on the basis of a length of time from when the position command for reversing the table 6 travel direction is output until when the magnitude of the machine deformation error change reaches 63%. In addition, the outputs of current detector 4 are multiplied by a torque constant to find the drive force $F_0$ so as to calculate the machine end rigidity in accordance with equation 6 discussed above.

In step S8, the ballscrew deformation error $\Delta X_1$, the machine deformation error $\Delta X_2$, and the first and second parameters are all transmitted to the control parameter memory 1b of numerical control apparatus 1 (FIG. 1). In step S9, the ballscrew rigidity and the machine end rigidity, which were calculated in step S7, are also transferred to the control parameter memory 1b whereby the automatic setting operation of the control parameters is terminated. Thus, when the numerical control apparatus is subsequently operated, the control parameters transmitted to the control parameter memory 1b will be utilized in the machine deformation error memory 39, the ballscrew deformation error memory 40, the first parameter memory 41a, the second parameter memory 42a, etc., in the servo amplifier 2.

More specifically, when the position command signal for reversing the travel direction of the table 6 is transmitted by the numerical control apparatus 1, the machine deformation error reading means 39a reads the machine deformation error from the memory 39 from a point in time based on the travel direction reversing timing signal output by the travel direction reversing timing signal generating means 35. This machine deformation error thus read is changed so that a signal rise occurs in a timewise manner based on the first parameter (the time constant for filter 41) now stored in the first parameter memory 41a, and is added to or subtracted from the position command signal so as to compensate the position command signal.

At the same time, the ballscrew deformation error reading means 40a reads the ballscrew deformation error from the ballscrew deformation error memory 40 from a point in time based on the travel direction reversing timing signal from unit 35. This deformation error thus read is changed so that a signal rise occurs in a timewise manner based on the second parameter (the time constant for filter 42) now stored in the second parameter memory 42a, and is added to or subtracted from the current command signal so as to compensate the current command signal.

It should be noted that the ballscrew deformation error and the machine deformation error values may be determined in the first test run so that the first and second parameters used to measure the period of time until the 63 percent values are reached can be determined in the second test run.

The numerical control system according to the present invention provides a novel means of dividing the positioning error of the table 6 into machine deformation error and ballscrew deformation error, whereby these errors are compensated for with high accuracy, and the control parameters required for this compensation can be automatically set. The foregoing description of the present invention, however, is intended to be illustrative only. Those skilled in the art will appreciate that many of the details given above can and should be modified to suit the needs of a given environment. For example, the displacement meter 18 described above to measure the absolute position of the workpiece 17 may also be designed to measure a relative position with respect to the table displacement $X_0$ or the table position detector 7 output $X_1$ in an arrangement as shown in FIG. 4, thereby measuring the absolute position indirectly.

Figure 4:
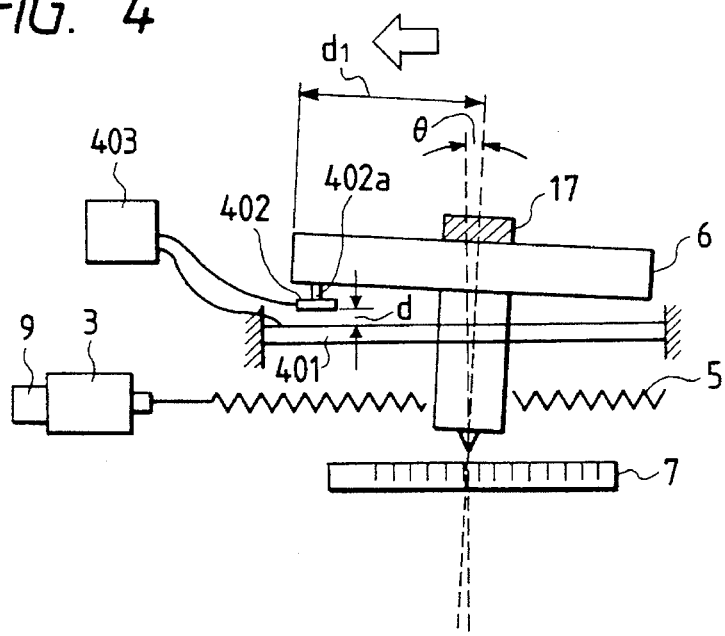
FIG. 4 illustrates another example of a displacement meter employed in FIG. 1.
Figure 7A:
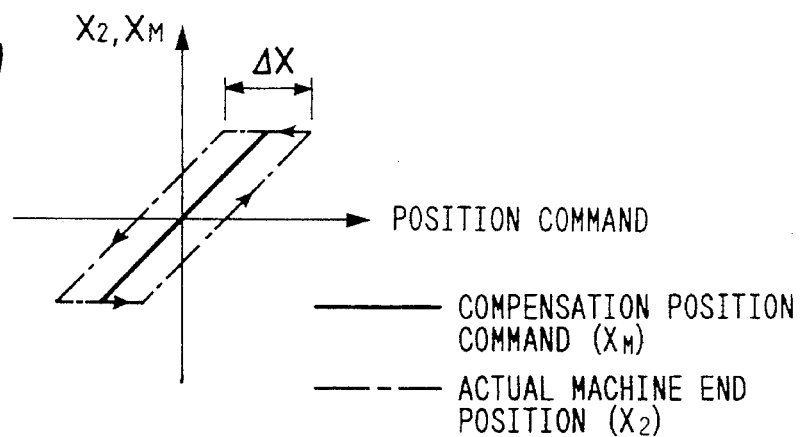
FIGS. 7(a) and 7(b) illustrate the relationship between the machine end displacement and the position command.
Figure 7B:
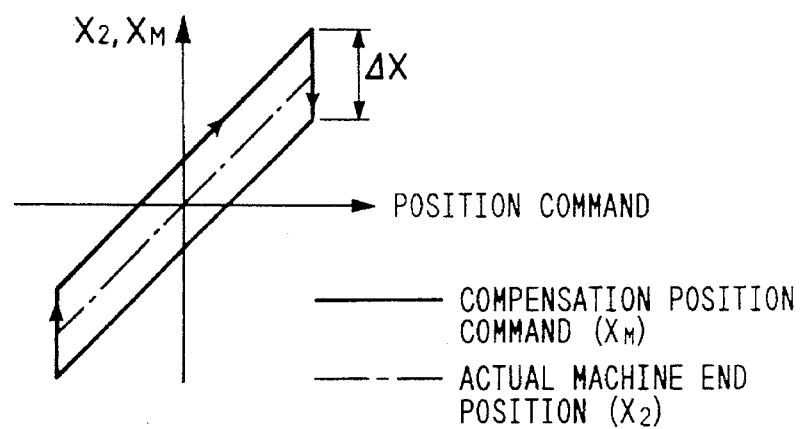

In particular, referring to FIG. 4, a metal plate 401 is permanently secured and supported by a base of the apparatus. The metal plate 401 is disposed a predetermined distance away from and in parallel with the table 6. A small metal plate 402, being supported by one end of table 6 via insulating material 402a, is disposed opposite of the metal plate 401. A space measuring means 403 measures a distance "d" between the metal plates 401 and 402 by measuring an electrostatic capacity therebetween. The metal plate 402 may be, for example, a magnetic head for detecting a change in inductance, and the space measuring means 403 may be, for example, used to measure the space "d" according to the change in inductance. The remaining elements illustrated in FIG. 4 are identical to those in FIG. 7 and need not be described in detail herein.

In order to obtain the position of the workpiece 17 in accordance with the construction illustrated in FIG. 4, a slant or tilt of table 6 can be found from the variation of the space "d" measured by space measuring means 403, and the position of the workpiece 17 can be calculated from the distance between the metal plate 402 and the point where the table 6 meets the ballscrew 5. By employing the arrangement described above, a displacement meter 18 of high-response can be obtained. In this case, the space measuring means 403 constitutes a machine deformation error detecting means, and the space measuring means 403 and the first parameter calculating means 41b constitute a first parameter determining means.

The ballscrew deformation error $\Delta X_1$, calculated by the ballscrew deformation error calculating means 40c on the basis of the variation of the difference between the detection output of the table position detector 7 and that of the motor end detector 9 at the reversal of the table 6 travel direction, may also be calculated on the basis of the variation of the detection output of the motor current detector 4.

In this case, the motor current detector 4 and the ballscrew deformation error calculating means 40b constitute a ballscrew deformation error detecting means, and the motor current detector 4, the ballscrew deformation error calculating means 40b and the second parameter calculating means 42b constitute a second parameter detecting means.

In another alternative embodiment, the automatic tuning section 80 (FIG. 1) can be omitted. The control parameter setting function in the operation flow chart shown in FIG. 3, however, requires operator time and labor. If the control parameter settings are made with high accuracy, the numerical control apparatus can carry out high precision positioning as described above.

Although the machine deformation error and the ballscrew deformation error were disclosed above as being compensated simultaneously, if only the machine deformation error is compensated, accurate control over the machining of the workpiece can still be obtained. In such a case, the elements particular to ballscrew deformation detection/compensation can be dispensed with.

It will be apparent that the invention, as described above, achieves an apparatus for and method of compensating for machine deformation error produced on the basis of a variation of a difference between a workpiece position and a table position at the reversal of a table travel direction, whereby machining accuracy in a full-closed loop can be enhanced. It will also be apparent that the invention makes novel use of a first change slowing means which gradually changes compensation amount to compensate for a machine deformation error in response to a change of the machine deformation error with time, whereby the machine deformation error can be compensated for with high accuracy in either a semi-closed loop, or a full-closed loop. It will be further apparent that the invention provides an apparatus for and a method of detecting or calculating a compensation amount used to compensate for table position accuracy and a parameter which indicates a timewise change of a compensation amount with time by performing a test run prior to the machining of the workpiece, whereby the compensation amount or the parameter indicating the change of the compensation amount with time can be found easily. Particularly, the invention achieves a servo control apparatus and a servo control method wherein a test run made prior to the machining of a workpiece causes corresponding detecting means to detect a machine deformation error, a first parameter indicating the timewise change of machine deformation error, a ballscrew deformation error indicating the magnitude of a change in deformation amount of a ballscrew at the reversal of the travel direction of a table, and a second parameter indicating the timewise change of the ballscrew deformation error, causes a position command signal for commanding the position of the table to be compensated for on the basis of said detected machine deformation error and first parameter, and causes a current command signal for commanding current flowing in a motor to be compensated for on the basis of said ballscrew deformation error and second parameter, whereby the initial setting of the apparatus can be made easily.

What is claimed is:

1. A servo control apparatus comprising:

a rotatable motor;

a workpiece position detection means for detecting a position of said workpiece;

a ballscrew rotating with a rotation of said motor;

a table, coupled to said ballscrew and supporting a workpiece, moving in a table travel direction in response to the rotation of said ballscrew;

table position detecting means for detecting a position of said table;

position command means for outputting a position command signal for specifying the position of said table;

travel direction reversing timing signal generating means for generating a travel direction reversing timing signal indicating a reversal of travel direction of said table;

machine deformation error storage means for storing a machine deformation error indicated by the magnitude of a change in difference between the position of said workpiece and the position of said table as detected by said table position detecting means at the reversal of said table travel direction;

position command compensating means for combining said machine deformation error stored in said machine deformation error storage means with said position command signal from a point of time based on said travel direction reversing timing signal to compensate said position command signal;

motor driving means for rotating said motor so that the detection output of said table position detecting means matches the output of said position command compensating means; and first change slowing means for receiving the machine deformation error stored in the machine deformation error storage means and outputting to said position compensating means, a signal based on said received machine deformation error that rises slowly with time.

2. The servo control apparatus as defined in claim 1, further comprising:

machine deformation error detecting means for detecting the machine deformation error;

wherein said machine deformation error storage means stores said machine deformation error detected by said machine deformation error detecting means.

3. The servo control apparatus as defined in claim 1, wherein the position command compensating means either adds or subtracts the output of said first change slowing means to or from the position command signal to compensate said position command signal.

4. The servo control apparatus as defined in claim 3, further comprising:

first parameter detecting means for detecting a first parameter indicating the timewise change of state of a difference between the position of the workpiece and the position of the table at the reversal of the table travel direction; and first parameter storage means for storing the first parameter detected by said first parameter detecting means;

wherein the first change slowing means outputs said signal based at least in part on said first parameter stored in said first parameter storage means.

5. The servo control apparatus as defined in claim 1, further comprising a motor rotation position detecting means for detecting the rotation position of said motor.

6. The servo control apparatus as defined in claim 5, further comprising:

switching selector means for switching between a first operation status wherein a motor driving means rotates the motor so that the position signal output by the position command compensating means matches the detection output of the table position detecting means, and a second operation status wherein the motor driving means rotates the motor so that said position signal matches the detection output of the motor rotation position detecting means;

wherein the machine deformation error is detected by the machine deformation error detecting means or the first parameter is detected by the first parameter detecting means in said first operation status.

7. A servo control apparatus comprising:

a motor rotated by a driving current under the control of a current command signal;

a ballscrew rotating with a rotation of said motor;

a workpiece position detection means for detecting a position of said workpiece;

a table, coupled to said ballscrew and supporting a workpiece, moving in a table travel direction in response to the rotation of said ballscrew;

travel direction reversing timing signal generating means for generating a travel direction reversing timing signal indicating a reversal of travel direction of said table;

ballscrew deformation error detecting means for detecting a ballscrew deformation error indicating the magnitude of a change in deformation amount of said ballscrew at the reversal of said table travel direction;

ballscrew deformation error storage means for storing said ballscrew deformation error detected by said ballscrew deformation error detecting means;

current command compensating means for combining said ballscrew deformation error stored in said ballscrew deformation error storage means with said current command signal from a point of time based on said travel direction reversing timing signal to compensate said current command signal;

change slowing means for receiving the ballscrew deformation error stored in said ballscrew deformation error storage means and outputting to said position compensating means, a signal based on said received ballscrew deformation error that rises slowly with time;

wherein the current command compensating means adds or subtracts the output signal of said change slowing means to or from the current command signal from a point of time based on the travel direction reversing timing signal to compensate said current command signal;

second parameter detecting means for detecting a second parameter indicating the timewise change of state of the deformation amount of the ballscrew at the reversal of the table travel direction; and second parameter storage means for storing the second parameter detected by said second parameter detecting means;

wherein the change slowing means outputs said signal that rises slowly with time based at least in part on said second parameter stored in said second parameter storage means.

8. A servo control apparatus comprising:

a motor rotated by a driving current under the control of a current command signal;

a workpiece detection means for detecting a position of said workpiece;

a ballscrew rotating with the rotation of said motor;

a table, coupled to said ballscrew and supporting a workpiece, moving in response to the rotation of said ballscrew;

table position detecting means for detecting a position of said table;

position command means for outputting a position command signal for specifying the position of said table;

travel direction reversing timing signal generating means for generating a travel direction reversing timing signal indicating a reversal of travel direction of said table;

ballscrew deformation error detecting means for detecting a ballscrew deformation error indicating the magnitude of a change in deformation amount of said ballscrew at the reversal of said table travel direction;

ballscrew deformation error storage means for storing said ballscrew deformation error detected by said ballscrew deformation error detecting means;

current command compensating means for combining said ballscrew deformation error stored in said ballscrew deformation error storage means with said current command signal from a point of time based on said travel direction reversing timing signal to compensate said current command signal;

machine deformation detecting means for detecting a machine deformation error;

machine deformation error storage means for storing the machine deformation error indicated by the magnitude of a change in difference between the position of said workpiece and the position of said table as detected by said table position detecting means at the reversal of said table travel direction;

position command compensating means for combining said machine deformation error stored in said machine deformation error storage means with said position command signal from a point of time based on said travel direction reversing timing signal to compensate said position command signal; and motor driving means for rotating said motor so that the detection output of said table position detecting means matches the output of said position command compensating means.

9. The servo control apparatus as defined in claim 8, further comprising:

switching selector means for switching between a first operation status wherein a motor driving means rotates the motor so that the position signal output by the position command compensating means matches the detection output of the table position detecting means, and a second operation status wherein the motor driving means rotates the motor so that said position signal matches the detection output of a motor rotation position detecting means; and wherein the machine deformation error is detected by the machine deformation error detecting means or the first parameter is detected by the first parameter detecting means in said first operation status and the ballscrew deformation error is detected by the ballscrew deformation error detecting means or the second parameter is detected by the second parameter detecting means in said second operation status.

10. In a servo control apparatus having a table coupled to a ballscrew and supporting a workpiece, said ballscrew being rotated by a motor in response to a driving current, said table having a position along a travel direction corresponding to rotation of said ballscrew, a method of controlling a servo comprising the steps of:

generating a driving current for rotating said motor;

detecting the position of said table;

detecting a position of said workpiece;

outputting a position command signal for specifying the position of said table;

generating a travel direction reversing timing signal upon reversal of travel direction of said table;

detecting a ballscrew deformation error indicating the magnitude of a change in deformation amount of said ballscrew at the reversal of said table travel direction;

compensating said driving current by combining said driving current with said ballscrew deformation error thus detected;

detecting a machine deformation error indicating the magnitude of a change in difference between the position of the workpiece and the position of said table at the reversal of said table travel direction;

compensating said position command by combining said machine deformation error with said position command from a point of time based on said reversal of said table travel direction; and generating a current command signal for driving said motor; and driving said motor so that the position of said table matches said compensated position command.

11. The servo control method as defined in claim 10, wherein the step of compensating said position command comprises the steps of outputting said machine deformation error signal as a signal that rises in the timewise change of state based on a first parameter, and adding or subtracting the machine deformation error to or from said position command signal.

12. The servo control method as defined in claim 11, wherein the step of compensating said driving current comprises the steps of outputting said ballscrew deformation error as a signal that rises in the timewise change of state based on a second parameter, and adding or subtracting the ballscrew deformation error to or from said driving current.

13. The servo control method as defined in claim 12, wherein said first and second parameters are time constants.

* * * * *